United States Patent [19]
Grubb

[11] Patent Number: 5,323,404
[45] Date of Patent: Jun. 21, 1994

[54] OPTICAL FIBER LASER OR AMPLIFIER INCLUDING HIGH REFLECTIVITY GRATINGS

[75] Inventor: Stephen G. Grubb, Warren, N.J.

[73] Assignee: AT&T Bell Laboratories, Murray Hill, N.J.

[21] Appl. No.: 145,933

[22] Filed: Nov. 2, 1993

[51] Int. Cl.$^5$ .......................... H01S 3/30; G02B 6/34
[52] U.S. Cl. .......................... 372/6; 372/3; 372/70; 372/72; 372/99; 372/102; 359/334; 359/341; 359/345; 359/346; 385/37
[58] Field of Search .................. 372/3, 6, 69, 70, 72, 372/92, 99, 102; 359/333, 334, 341, 345, 346; 385/31, 37

[56] References Cited

U.S. PATENT DOCUMENTS

| | | | |
|---|---|---|---|
| 4,778,238 | 10/1988 | Hicks | 372/6 X |
| 5,058,974 | 10/1991 | Mollenauer | 372/6 X |
| 5,134,620 | 7/1992 | Huber | 372/6 |
| 5,151,908 | 9/1992 | Huber | 372/6 |
| 5,157,747 | 10/1992 | Atkins et al. | 385/37 |
| 5,159,601 | 10/1992 | Huber | 372/6 |
| 5,177,562 | 1/1993 | Wysocki et al. | 372/6 X |
| 5,191,586 | 3/1993 | Huber | 372/6 |
| 5,195,161 | 3/1993 | Adar et al. | 385/129 |
| 5,218,655 | 6/1993 | Mizrahi | 385/39 |
| 5,235,659 | 8/1993 | Atins et al. | 385/124 |
| 5,237,576 | 8/1993 | DiGiovanni et al. | 372/6 |
| 5,243,609 | 9/1993 | Huber | 372/6 X |
| 5,268,910 | 12/1993 | Huber | 372/6 |

OTHER PUBLICATIONS

S. E. Miller, "Optical Fiber Telecommunications", Academic Press 1979, pp. 127–133, 133, 135 and 140–144 (1979).

S. G. Grubb, et al. "+24.6 dBm Output Power Er/Yb Codoped Optical Amplifier Pumped By Diode-{umped Nd:YLF Laser" *Electronics Letters*, vol. 28, No. 13, pp. 1275–1276 (1992).

M. Nakazawa, et al. "Active transmission line: light amplification by backward–stimulated Raman scattering in polarization-maintaining optical fiber" *Journal of the Optical Society of America*, vol. 1, No. 1, pp. 80–85, (1984).

V. I. Belotitskii, et al. "Amplification of semiconductor laser radiation in the wavelentth range 1.24–1.3 $\mu$m by stimulated Raman scattering in an optical fiber" *Sov. J. Quantum Electron*, vol. 20, No. 7, pp. 753–755 (1990).

P. N. Kean, et al. "Experimental evaluation of a fibre Raman oscillator having fibre grating reflectors" *J. of Modern Optics*, vol. 35, No. 3, pp. 397–406 (1988).

C. Lin, et al. "A cw tunable near-infrared (1.085–1.175-$\mu$m Raman oscillator" *Optics Letters*, vol. 1, No. 3, pp. 96–97 (Sep. 1977).

F. Irrera, et al. "Generation of high intensity cw stimulated Raman scattering in a single-mode fiber" *J. Appl. Phys.*, vol. 63, No. 8, pp. 2882–2883 (Apr. 1988).

C. Lin, et al. "Phase matching in the minimum--chromatic-dispersion region of single-mode fibers for stimulated four-photon mixing" *Optics Letters*, vol. 6, No. 10, pp. 493–495 (Oct. 1981).

J. L. Zyskind, et al. "Erbium-Doped Fiber amplifiers and the Next Generation of Lightwave Systems" *AT&T Technical Journal* (Jan/Feb. 1992).

*Primary Examiner*—Brian Healy
*Attorney, Agent, or Firm*—Eugen E. Pacher

[57] ABSTRACT

Novel optical fiber devices (amplifiers and lasers) are disclosed. The devices comprise one or more optical "cavities", depending on the type of device. The cavities typically are formed by means of in-line refractive index gratings in a length of silica-based optical fiber. The gratings typically have peak reflectivity of at least 98%. Use of such cavities enables CW pumping of the devices, making the devices suitable for use in optical fiber communication systems. In an exemplary embodiment the device is a Raman amplifier for 1.3 $\mu$m signal radiation, and in another exemplary embodiment the device is a Raman laser having an output suitable for pumping an Er-doped fiber amplifier. An exemplary pump radiation source is a laser diode-pumped CW Nd:YAG laser.

21 Claims, 3 Drawing Sheets

OPTICAL FIBER LASER OR AMPLIFIER INCLUDING HIGH REFLECTIVITY GRATINGS

FIELD OF THE INVENTION

This invention pertains to the field of optical fiber amplifiers and lasers, and to apparatus (e.g., optical fiber communication systems) that comprises such amplifiers and/or lasers. The amplifiers and lasers exemplarily are Raman or Brillouin amplifiers and lasers, or involve four-photon mixing.

BACKGROUND OF THE INVENTION

It is well known that stimulated Raman scattering (SRS) in optical fiber can, in principle, be utilized for amplification of signal radiation as well as for a laser. Stimulated Brillouin Scattering (SBS) and four-photon mixing in optical fibers are also known. See, for instance, "Optical Fiber Telecommunications", S. E. Miller et al., editors, Academic Press 1979; pages 127–133, 133–135, and 140–144, respectively, all incorporated herein by reference. See also "Tunable Lasers", L. F. Mollenauer et al., editors, Springer Verlag, pp. 279–301, also incorporated herein by reference. Optical fiber lasers and amplifiers based on SRS, SBS, or four-photon mixing will herein collectively be referred to as "non-linear interaction" (NLI) lasers or amplifiers, as the case may be.

To the best of my knowledge, NLI lasers or amplifiers have so far not been used in optical communication systems.

One of the reasons for the neglect of NLI lasers and amplifiers is the difficulty of achieving in the optical fiber the required high CW pump radiation intensities. For instance, with regard to SRS, much of the relevant prior art involves the use of pulsed pump radiation. The obtainable high peak power of the pump pulses results in substantial SRS despite the relatively low efficiency of SRS. Pulsed pump power is, of course, not useful for, e.g., signal amplification in an optical fiber communication system, or for a continuous wave (CW) laser. For example, use of a pulsed amplifier would require synchronization of the pump laser to the signal. This is not only impractical but also would negate one of the main advantages of optical amplification, namely, the possibility of changing the signal transmission rate without making any changes in the amplifiers.

In view of the many desirable characteristics potentially possessed by NLI amplifiers and lasers, it would be desirable to find a way to, inter alia, increase efficiency such that CW pumping becomes practical. For instance, it would be desirable to have available NLI devices that can efficiently utilize CW pump radiation from commercially available laser diodes or laser pumped solid state diodes to produce high intensity CW radiation of a wavelength that is of interest for optical communications (e.g., 1.55 μm), or to amplify radiation of a wavelength (e.g., 1.3 μm) for which other convenient optical amplifiers do not exist. This application discloses such devices.

High power laser sources of CW radiation of appropriate wavelength (e.g., 1.06 μm) are known. Exemplarily, a Nd:YAG laser is pumped with the high power 0.8 μm output of an array of AlGaAs laser diodes. Whereas the output of such a diode laser array cannot be efficiently coupled into a single mode optical fiber, the output of the Nd:YAG laser can readily be coupled into such fiber. See, for instance, S. Grubb et al., *Electronics Letters*, Vol. 28(13), p. 1275.

M. Nakazawa et al., *Journal of the Optical Society of America*, Vol. 1(1), p. 80 discloses a Raman amplifier that uses a pulsed (1.06 μm) YAG pump laser to amplify 1.3 μm signal pulses and reports a gain coefficient of $2.0 \times 10^{-12}$ cm/W. V. I. Belotitskii et al., *Soviet Journal of Quantum Electronics*, Vol. 20(7), p. 753 report Raman amplification of 1.24–1.3 μm radiation using a Q-switched YAG:$Nd^{3+}$ laser (1.06 μm). P. N. Kean et al., *Journal of Modern Optics*, Vol. 35(3), p. 397, disclose an optical fiber Raman oscillator that uses a pulsed (mode-locked) Nd:YAG laser (1.06 μm). In one embodiment, the laser cavity is defined by two etched fiber gratings. The output radiation had a wavelength of about 1.09 μm. C. Lin et al., *Optics Letters*, Vol. 1(3). p. 96 disclose a Raman oscillator that uses a CW (Nd:YAG; 1.06 μm) pump laser. The Raman laser cavity is defined by means of mirrors. The output had wavelength in the range 1.08–1.17 μm. F. Irrera et al., *Journal of Applied Physics*, Vol. 63(8), p. 2882 observed SRS in silica-based optical fiber, using a CW Nd:YAG (1.06 μm) pump laser. Only the first two Stokes lines (1.12 and 1.18 μm) were observed, with the power in the second being only about 4% of the power in the first (for 5.7 W pump power). FIG. 7.8 of "Tunable Lasers" (op. cit.) shows the wideband continuum radiation generated in silica fiber pumped with a Q-switched Nd-YAG laser at 1.06 μm. And C. Lin et al., *Optics Letters*, Vol. 6(10), p. 493 (incorporated herein by reference) report four-photon mixing in single mode optical fiber using a Q-switched Nd:YAG laser at 1.319 μm.

SUMMARY OF THE INVENTION

In one aspect the invention is embodied in apparatus (e.g., an optical fiber communication systems) that comprises an optical device, namely, an optical fiber NLI amplifier or laser. The apparatus comprises a length of optical waveguide, typically silica-based optical fiber, and means for introducing pump radiation of wavelength $\lambda_p$ into the length of optical waveguide. The device is adapted for emission of radiation of wavelength $\lambda_s$ from the length of optical waveguide, where $\lambda_s \approx \lambda_p$, typically $\lambda_s > \lambda_p$. The device further comprises spaced apart reflector means that define an optical "cavity" for electromagnetic radiation of a predetermined wavelength, with the cavity comprising at least a portion of the length of optical waveguide.

Significantly, the pump radiation is CW radiation, and the reflector means comprise at least two pairs of reflectors, associated with each of said reflectors is a center wavelength of a reflection band, wherein the two reflectors of a given pair have the same (except perhaps for an unintended minor difference) center wavelength and are spaced apart, such that the reflectors of a given pair define an optical cavity of length $L_i$ for radiation of wavelength $\lambda_i$ essentially equal to said center wavelength of the reflectors of the given pair. Associated with the given cavity is an added round trip loss for radiation of wavelength $\lambda_i$. For efficient wavelength conversion the optical cavity must have low added loss, typically less than 1.5 dB added round trip loss, preferably less than 1.0 dB added round trip loss. The devices according to the invention are NLI amplifiers and lasers.

Although in principle any high reflectivity fiber reflecting means (e.g., etched gratings, multilayer mirrors formed directly on a fiber end face) could be used, the preferred reflectors are in-line refractive index gratings, and the remainder of the discussion substantially will be in terms of such in-line gratings. Such gratings are known. See, for instance, U.S. Pat. Nos. 5,218,655 and 5,235,659, both incorporated herein by reference. Use of one pair of such gratings in conjunction with rare earth-doped optical fiber, to form an optical fiber laser, is also known. See U.S. patent application Ser. No. 07/965,457, filed Oct. 23, 1992 by R. M. Atkins et al.

If the device is a Raman laser or amplifier, or a Brillouin laser or amplifier, then $\lambda_i = \lambda_{i-1} + \Delta\lambda_i$, where $\Delta\lambda_i$ is a length within the appropriate Stokes band associated with the fiber, $i = 1, \ldots n$, where n is an integer equal to or greater than 2, and $\lambda_{i-1}$ is defined to be $\lambda_p$ if $i=1$. For amplifiers, $\lambda_p < \lambda_n < \lambda_s$, and for lasers $\lambda_p < \lambda_n \leq \lambda_s$. In the latter case, with $\lambda_n = \lambda_s$, one of the reflectors of the $\lambda_n$-pair will have low (e.g., $\approx 5\%$) reflectivity.

NLI lasers and amplifiers according to the invention utilize the discovery that, by providing low loss optical cavities that facilitate circulation of radiation of a given wavelength, the relevant non-linear interactions can be significantly enhanced, making CW pumping feasible.

For instance, in Raman lasers or amplifiers according to the invention, a large fraction (typically >50%, preferably >90%) of the power at a given wavelength can be converted by SRS to the next Stokes wavelength, such that pump power can be shifted efficiently, in a multiplicity of stages, to a desired longer wavelength. The wavelength $\lambda_i$ at a given stage is determined by the center wavelength of the relevant pair of reflectors, provided that the center wavelength is chosen such that the wavelength difference ($\Delta\lambda_i$) between the preceding stage ($\lambda_{i-1}$) and the given stage ($\lambda_i$) is within the Stokes band associated with the optical fiber. Since Stokes bands in conventional optical fibers typically are relatively wide, substantially any desired wavelength $\lambda_s$ substantially greater than $\lambda_p$ and below about 2 $\mu$m can be generated by a silica-based multi-stage device according to the invention, or can be amplified by such a device. Highest efficiency generally is attained if the spacing $\Delta\lambda_i$ between adjacent center wavelengths corresponds to the Stokes shift associated with the peak in the Stokes band.

The above described principle of using low loss optical cavities to achieve wavelength shifts can be extended to provide an anti-Stokes Raman laser or amplifier, with $\lambda_s < \lambda_p$. As is well known, the anti-Stokes shift generally is much weaker than the Stokes shift. Thus, it will typically be necessary to introduce loss into the cavity at the stronger Stokes wavelengths while providing feedback at the anti-Stokes wavelength. Furthermore, for anti-Stokes lasers or amplifiers according to the invention, we contemplate use of one or more optical cavities, typically fewer than in the case of Stokes lasers and amplifiers.

Devices according to the invention based on SBS will typically closely resemble the corresponding device based on SRS, but the wavelength spacing $\Delta\lambda_i$ in the former will typically be substantially smaller than in the corresponding SRS-based device. As is well known, SBS involves interaction with acoustic phonons, whereas SRS involves interaction with optical phonons. This accounts for the difference in $\Delta\lambda_i$ in the two categories of devices.

Devices based on four-photon mixing are also contemplated. Resonating the radiation by means of appropriately chosen reflectors can significantly increase the intensity of the radiation in the fiber, resulting in substantial enhancement of four-photon mixing. Typically, the phase matching requirement in four-photon mixing can be readily satisfied if the device operates in a spectral region (e.g., around 1.313 $\mu$m) where the material and waveguide dispersion contributions are favorable for phase matching. Exemplarily, a Raman laser according to the invention can be used to pump a four-photon mixing laser or amplifier, as will be discussed in more detail below.

As disclosed above, provision of reflection means at appropriate wavelengths can result in substantially increased optical intensity at these wavelengths, which in turn can result in enhanced NLI device efficiency. The relevant non-linear processes optionally can additionally be enhanced by means of "seeding" with external light. By this I mean introduction into an optical cavity of CW radiation of the corresponding wavelength. For instance, in a Raman device according to the invention, seeding at one of the wavelengths $\lambda_i$ ($\neq \lambda_p$) can help start the conversion cascade.

A further advantage that can result from the use of resonant cavities for pumping an NLI amplifier (e.g., a 1.24 $\mu$m cavity for a 1.31 $\mu$m Raman amplifier) is the long (e.g., hundreds of microseconds) effective lifetime of the pump radiation in the cavity. This can make it possible to operate the amplifier in saturation, that is to say, the pump substantially cannot be depleted on a short (e.g., microseconds) time scale.

DETAILED DESCRIPTION OF EXEMPLARY EMBODIMENTS

It will be appreciated that an optical fiber NLI amplifier or laser according to the invention utilizes an intrinsic property of the material of the fiber, and does not require the presence of a special dopant in the fiber. On the other hand, the material of the fiber need not (and generally will not) be a single-constituent material. Since silica-based optical fibers are currently the fibers of choice for communications purposes, the discussion herein will focus on fiber that is predominantly (>50, frequently >80 mole %) $SiO_2$.

Figure 5:
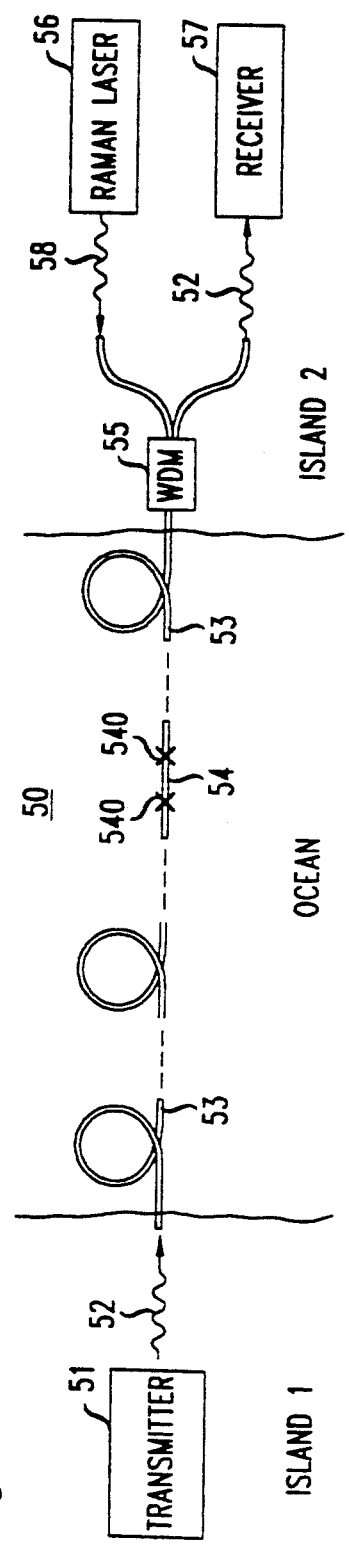
FIG. 5 shows schematically an exemplary remotely pumped optically amplified optical fiber communication system that comprises a Raman laser according to the invention.

FIG. 5.1 on p. 127 of the above cited book "Optical Fiber Telecommunications" shows the Raman spectrum of pure fused silica at room temperature. As can be seen, the Stokes band has a maximum at about 450 $cm^{-1}$ and is relatively broad, about 100 $cm^{-1}$ full width at half maximum (FWHM). The figure also shows the (much weaker) anti-Stokes band.

Figure 6:
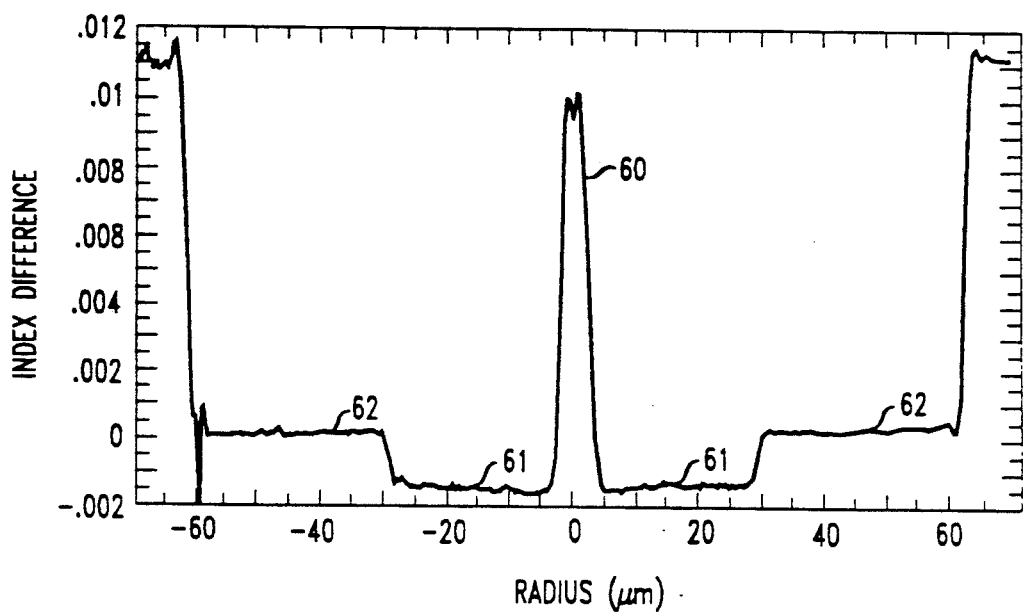
FIG. 6 shows the refractive index profile of an optical fiber that is useful in the practice of the invention.

Germania is almost universally used as index-raising dopant in silica-based optical fibers. The presence of $GeO_2$ is known to result in an increase in the peak height of the Stokes band. The presence of other possible fiber constituents may further modify the spectrum. For instance, the presence of $P_2O_5$ in silica results in a further peak at about 1320 cm$^{-1}$. The refractive index profile of an exemplary single mode optical fiber that can be used to practice the invention is shown in FIG. 6. The Ge-doped core 60 has 6.1 μm diameter, the deposited cladding region 61 surrounding the core is F-doped, and outer cladding region 62 is undoped silica.

Figure 1:
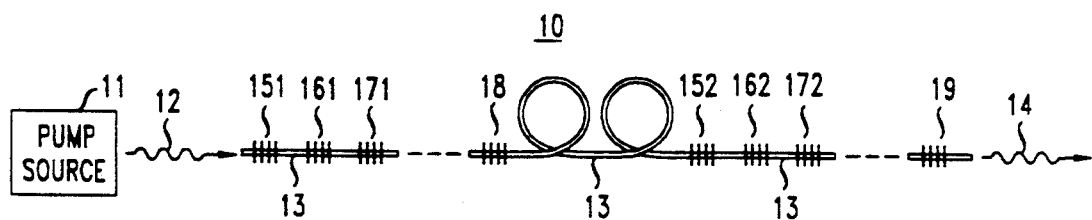
FIGS. 1 and 2 schematically depict apparatus that comprises exemplary Raman lasers according to the invention.

FIG. 1 schematically depicts an exemplary embodiment of the invention, a Raman laser 10. Pump radiation 12 (of wavelength $\lambda_p$, e.g., 1.064 μm) from pump source 11 is coupled into single mode optical fiber 13, and radiation 14 of wavelength $\lambda_s$ is emitted from the output end of the fiber. Numerals 151, 152, 161, 162, 171, 172, 18 and 19 refer to in-line refractive index gratings, with 151 and 152, 161 and 162, 171 and 172, ... forming matched reflector pairs, of, exemplarily, center wavelengths 1.117 μm, 1.175 μm, 1.240 μm, ... respectively. Optional unpaired grating 18 exemplarily has center wavelength equal to $\lambda_s$, and optional unpaired grating 19 has center wavelength equal to $\lambda_p$. For the exemplary center wavelengths, $\lambda_s$ is 1.315 μm. All gratings desirably have high reflectivity, with substantially 100% (>98%) reflectivity at the center wavelength, and with FWHM of the reflection curve typically being in the range 2–8 nm, substantially less than the FWHM of the Stokes band.

Typically, laser 10 also comprises an unpaired low reflectivity (typically ≲5%) reflector (not shown) for radiation of wavelength $\lambda_s$ on the output side of the device, so that most of the power of wavelength $\lambda_s$ is coupled out of the laser. This reflector can be a grating, but in many cases a cleaved fiber end provides sufficient reflectivity.

The cavity lengths exemplarily are of order 1 km (i.e., between about 300 m and about 3 km). Since the attenuation in the fiber typically depends on the wavelength, the optimum cavity length for a given wavelength will typically be different for different wavelengths.

Figure 2:
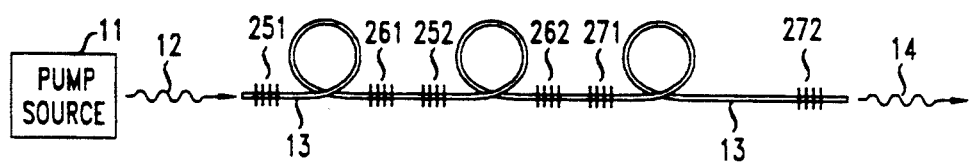

In-line refractive index gratings can be essentially 100% transmissive at wavelengths outside of the reflection band, thereby enabling flexibility in the placement of reflectors. For instance, the optical cavities may be sequential or overlapping to various degrees. FIG. 2 schematically shows an exemplary laser with overlapping cavities, with gratings 251 and 252, 261 and 262, and 271 and 272 being matched pairs. Optional reflectors such as pump reflector and high and low reflectivity output reflector are not shown.

Figure 3:
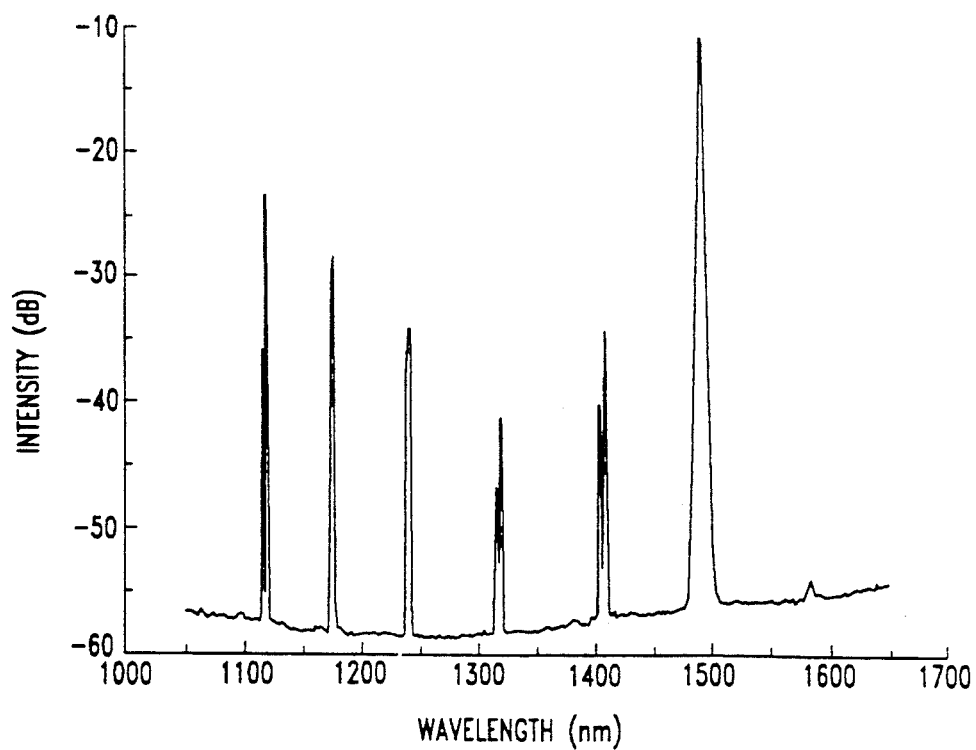
FIG. 3 shows an exemplary spectrum of a Raman laser according to the invention.

The emitted laser power can be a significant fraction (typically >10%, preferably >25%, frequently even greater than 50%) of the pump power. Furthermore, the power in each Stokes order in the Raman laser can be substantially less than the power at $\lambda_s$. This is exemplified by FIG. 3, which shows the output spectrum of an exemplary Raman laser according to the invention, pumped with 1.064 μm radiation, with $\lambda_s = 1.490$ μm.

Those skilled in the art will appreciate that the arrangement of gratings is not limited to the depicted exemplary arrangements. They will also realize that a Raman laser according to the invention can comprise more than 3 pairs of reflectors. For instance, a laser with 6 pairs can have $\lambda_s$ of 1.490 μm (for $\lambda_p = 1.064$ μm; see FIG. 3), suitable as pump radiation for a Er-doped fiber amplifier. In particular, such a laser exemplarily has utility as pump source in an optical fiber communication system that comprises a remotely pumped optical fiber amplifier.

Another embodiment of the instant invention is a Raman amplifier, exemplarily an amplifier for 1.3 μm signal radiation. As is well known to those skilled in the art, there is to date no convenient, silica fiber-based, optical fiber amplifier for this wavelength region. On the other hand, most installed optical fiber communication systems operate at about 1.3 μm, and it would be highly desirable to be able to upgrade these systems by, inter alia, replacing the currently used "repeaters" with optical amplifiers. See, for instance, J. L. Zyskind et al., *AT&T Technical Journal*, January/February 1992, p. 53.

Figure 4:
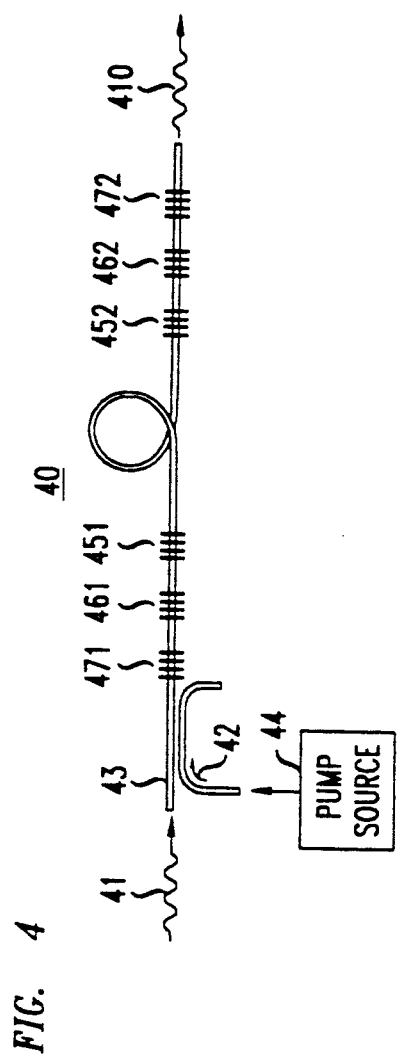
FIG. 4 schematically depicts apparatus that comprises an exemplary Raman amplifier according to the invention.

FIG. 4 schematically depicts an exemplary Raman optical amplifier 40 according to the invention. Signal radiation 41 is coupled into fiber 43 (e.g., by means of a conventional fusion splice between 43 and a conventional transmission fiber, not shown). Pump radiation 42 from pump radiation source 44 is also coupled into 43, e.g., by means of a conventional wavelength division multiplexer (WDM). The fiber amplifier comprises a multiplicity of matched in-line refractive index gratings, e.g., 451 and 452, 461 and 462, and 471 and 472. Exemplarily, $\lambda_p = 1.064$ μm, the grating center wavelengths are 1.117, 1.175 and 1.240 μm, respectively, and $\lambda_s = 1.310$ μm. Pump radiation is efficiently transformed into radiation of wavelength 1.240 μm by SRS, and signal radiation 41 is amplified by SRS, with numeral 410 referring to the amplified signal. The matched reflector pairs comprise high reflectivity gratings. Those skilled in the art will appreciate that care has to be taken not to introduce feedback at $\lambda_s$. For instance, use of fusion splices results in low reflected power. Placing an optional optical isolator after the amplifier can further reduce feedback. Wavelength-dependent loss means (e.g., tilted in-line refractive index gratings) can be used to remove unwanted wavelengths from the fiber and can optionally be used in devices according to the invention.

It will be appreciated that in an amplifier according to the invention the signal is injected into an optical cavity in which pump power is circulating, with consequently greatly enhanced effective pump power, resulting in high amplification efficiency. As in the case of lasers according to the invention, in amplifiers there exists flexibility in the placement of the gratings, making possible sequential, overlapping and/or other cavity arrangements.

FIG. 5 schematically depicts an exemplary apparatus according to the invention, namely, a remotely pumped optical fiber communication system 50. Such systems are of considerable interest for, e.g., inter-island communications over distances of, typically, a few hundred kilometers, since they can be constructed without underwater active components (e.g., repeaters and lasers). On island 1 is located transmitter 51, typically comprising an EDFA (erbium doped fiber amplifier) that serves as power amplifier. Such amplifiers are known. Signal radiation 52 (typically of approximate wavelength 1.5 μm, exemplarily 1.55 μm) is coupled into conventional transmission fiber 53 which is part of a submarine cable (not shown). Several hundred (e.g., about 300) kilometers from the transmitter is located a length of Er-doped optical fiber 54, typically joined to the transmission fibers by means of fusion splices 540. Fiber 54 can be located a considerable distance from island 2, e.g., about 50–100 km. On island 2 is located Raman pump laser 56 according to the invention, exemplarily having $\lambda_s$ of about 1.48 μm. Exemplarily, the pump laser has CW output power of about 100–500 mW. Pump radiation 58 is coupled into transmission fiber 53 by means of WDM 55, propagates towards amplifier fiber 54, where it serves to pump the Er-ions, with consequent amplification of signal radiation 52. The amplified signal radiation propagates to island 2, and is coupled into conventional receiver 57 by means that include WDM 55. The receiver optionally comprises a conventional EDFA pre-amplifier, not shown. However, in many cases it will be possible to dispense with the pre-amplifier, since the signal radiation undergoes amplification by SRS in the transmission fiber in the presence of pump radiation 58. In effect, the presence of the pump radiation in the transmission fiber provides signal gain, thereby effectively reducing the attenuation of the fiber.

Those skilled in the art will know that FIG. 5 shows only the portion of the communication system that enables signal transfer from island 1 to island 2, and that a complete system typically comprises similar means that enable signal transfer from island 2 to island 1. They will also understand that FIG. 5 does not show many (conventional) components (e.g., optical isolators, splices, or pump reflector) that will typically be part of a communication system. Finally, it will be understood that remotely pumped optical fiber communication systems are not restricted to inter-island or other submarine use but can also find terrestrial use.

Devices according to the invention can be combined in a variety of ways, and all such combinations are contemplated. For instance, amplifiers according to the invention can be cascaded, preferably with a filter element (e.g., an in-line refractive index grating that passes radiation of wavelength $\lambda_s$ and substantially blocks radiation of wavelength different from $\lambda_s$) between adjacent lasers. Such a multi-stage amplifier can have advantages over an equivalent single-stage amplifier, e.g., in regard to signal-to-noise ratio.

An amplifier according to the invention can, if desired, serve to amplify the output of a laser according to the invention. Furthermore, a device according to the invention is not limited to the use of a single pump source. For instance, use of two or more pump sources of appropriately spaced wavelengths in a Raman amplifier can effectively broaden the gain band of the amplifier.

Gain band broadening can also be achieved by provision of reflectors of appropriately spaced center frequencies. For instance, a Raman amplifier with 1.06 μm pump radiation, with paired reflectors of center wavelengths 1.12 μm, 1.175 μm, 1.24 μm and 1.26 μm will typically have substantially broadened gain band, as compared to, for instance, an analogous amplifier without the 1.26 μm reflector pair.

Figure 7:
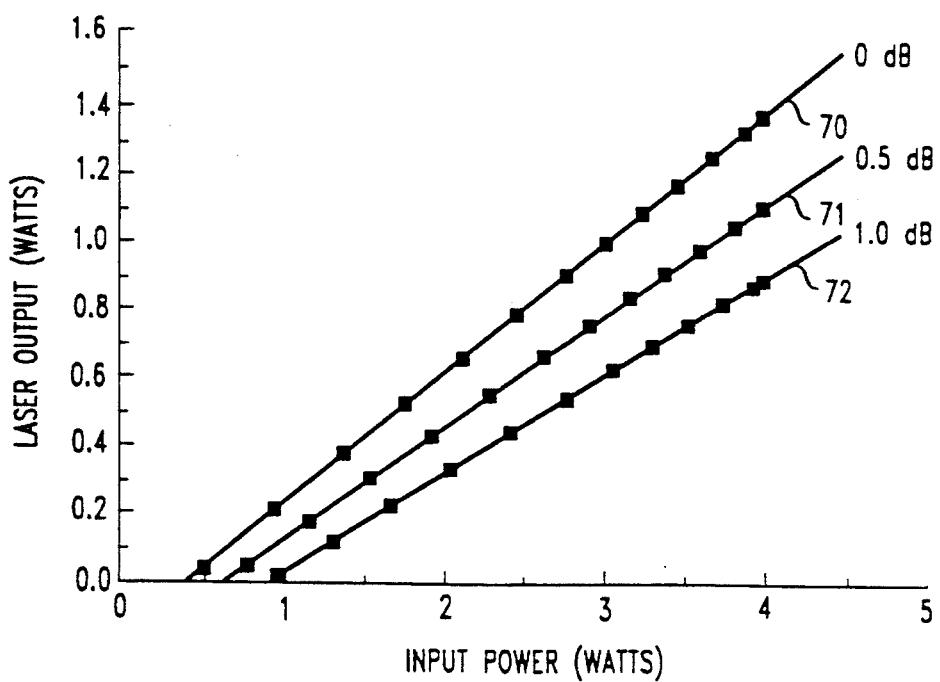
FIG. 7 shows exemplary data on Raman laser output for various values of added round trip loss.

In general, devices according to the invention that utilize silica-based optical fiber are expected to be useful in the approximate wavelength region 0.8–2.0 μm. Outside of this region intrinsic losses in the fiber typically are too high. However, not only should the intrinsic fiber loss typically be relatively low but the added round trip loss due to the reflectors, couplers and other components has to be kept to a minimum, typically to less than 1.5 dB (preferably less than 1 dB) at the relevant wavelength (e.g., at about 1.55 μm). The added round trip loss at a given wavelength herein is the total round trip loss at the wavelength that is associated with a given length of fiber, with all the components (e.g., reflectors, connectors, WDM) in place, minus twice the loss at the same wavelength of the same length of fiber as straight-through fiber, i.e., without the components. FIG. 7 illustrates the sensitivity of devices according to the invention to added loss, with curves 70-72 corresponding to, respectively, 0, 0.5 and 1 dB added round trip loss.

Although in-line refractive index fiber gratings are the currently preferred reflector means, use of other reflector means is also contemplated. For instance, an optical cavity can be formed by coupling the length of optical fiber to planar waveguide reflectors. Exemplarily the reflectors are embodied in silicon optical bench technology (see, for instance, U.S. Pat. No. 5,195,161). Cavity-forming reflectors in embodiments of the invention preferably have peak reflectivity of at least 98%. Lower reflectivity results in reduced operating efficiency and is generally undesirable. However, a non-symmetric cavity, with one high reflectivity reflector and one low reflectivity reflector, may be provided, e.g., in NLI lasers.

The conditions for 4-photon mixing in optical fiber are well known. See, for instance, C. Lin et al., *Optics Letters*, Vol. 6(10), p. 493, incorporated herein by reference. Provision of reflectors to form one or more optical cavities can result in increased efficiency of the mixing process, making 4-photon mixing lasers and amplifiers possible. Since the required phase matching typically can only occur at or near the zero dispersion wavelength (about 1.32 μm in silica-based fiber), $\lambda_p$ typically is selected to be about 1.32 μm. The pump radiation can be derived from a Raman laser according to the invention, but other pump sources are also contemplated (e.g., a Nd:YLF laser; the acronym designates yttrium lithium fluoride). In a particular embodiment, one of the center wavelengths $\lambda_i$ of the Raman laser coincides with the anti-Stokes wavelength (e.g., 1.09 μm) of the 4-photon mixing device, whereby anti-Stokes photons may be recycled back to the 1.32 μm pump wavelength.

EXAMPLE 1

In a 2 km length of dispersion shifted $SiO_2$-based single mode optical fiber (core diameter about 6.1 μm, depressed cladding diameter about 60 μm, core Ge-doped to about 0.01 refractive index difference, depressed cladding F-doped to about −0.0018 refractive index difference, both relative to pure $SiO_2$), in-line refractive index gratings were formed by exposure of hydrogen-loaded fiber regions to intersecting beams of UV radiation, substantially as disclosed in U.S. Pat. Nos. 5,218,655 and 5,235,659. In one end of the length of fiber (the input end) were formed gratings that had center wavelengths at 1.117, 1.175, 1.240, 1.315, 1.405 and 1.490 μm, respectively, and in the other end (the output end) were formed gratings having center wavelengths at 1.117, 1.175, 1.240, 1.315, 1.405 and 1.064 μm. Each grating was about 1 cm long, had about 100% peak reflectivity and FWHM of about 4 nm. The 1.064 μm grating served as pump light reflector, the other gratings formed optical cavities. CW radiation of wavelength 1.064 μm from a commercially available (Quantronix Model 114) Nd:YAG CW laser was coupled into the input end of the optical fiber by means of a conventional microscope objective lens, resulting in emission of 1.490 μm radiation from the output end of the fiber. Specifically, 1.01 W of 1.490 μm radiation was emitted from the fiber for 3.7 W of pump radiation. The observed output radiation of the laser had a spectral width of about 2 nm FWHM.

EXAMPLE 2

In a 3 km length of fiber as described in Example 1 were formed in-line refractive index gratings substantially as described. Both input and output end of the fiber had gratings with center wavelengths at 1.117, 1.175 and 1.240 μm, respectively. Care was taken not to introduce feedback at the wavelength of the next higher Stokes order (1.310 μm). To this end, the fiber ends were fusion spliced to WDM couplers. Pumping the fiber with 800 mW of 1.064 μm CW radiation from the Nd:YAG laser referred to in example 1, resulted in 25 dB gain of 1.31 μm signal radiation that was coupled into the input end of the fiber and emitted from the output end.

EXAMPLE 3

A 500 m length of fiber substantially as described in Example 1 is provided. Refractive index gratings, with center wavelengths at 1.09 μm and 1.67 μm, are formed in the fiber by conventional means, such that optical cavities are formed at the two wavelengths. Both 1.09 μm gratings and one 1.67 μm grating have about 100% reflectivity, the other 1.67 μm grating has about 50% reflectivity. A diode-pumped $Nd^{3+}$:YLF laser provides CW pump radiation of wavelength 1.313 μm. The pump radiation is coupled into the optical cavities by conventional means, resulting in generation of (anti-Stokes) radiation at 1.09 μm and (Stokes) radiation at 1.67 μm by four-photon mixing. Radiation of wavelength 1.67 μm is emitted from the low reflectivity end of the fiber. The device thus is a 4-photon mixing laser.

EXAMPLE 4

Providing a device as described in Example 3, except that only the 1.09 μm cavity is present in the fiber, results in a 4-photon mixing amplifier for 1.67 μm radiation.

I claim:

1. Apparatus comprising an optical device that comprises
    a) a length of optical fiber;
    b) means for introducing pump radiation of wavelength $\lambda_p$ into said length of optical fiber;
    c) spaced-apart reflector means that define an optical cavity for radiation of a predetermined wavelength, with the cavity comprising at least a portion of the length of optical fiber; wherein the device is adapted for emission of radiation of wavelength $\lambda_s \neq \lambda_p$ from said length of optical fiber; characterized in that
    d) the pump radiation is continuous wave radiation;
    e) the reflector means comprise at least two pairs of reflectors, associated with each of said reflectors is a center wavelength of a reflection band, the two reflectors of a given pair have essentially the same center wavelength and are spaced apart, such that the reflectors of the given pair define an optical cavity for radiation of wavelength equal to said center wavelength of the reflectors of the given pair; and
    f) associated with said given optical cavity is an added round trip loss for radiation of wavelength equal to said center wavelength, said added round trip loss being at most 1.5 dB.

2. Apparatus according to claim 1, wherein said optical fiber is silica-based optical fiber, and wherein the two reflectors of at least one of said pairs of reflectors are in-line optical fiber refractive index gratings in said optical fiber, with each of said two refractive index gratings having a peak reflectivity of at least 98%.

3. Apparatus according to claim 1, wherein the optical device is a Raman laser or a Brillouin laser, and wherein
    i) $\lambda_s$ is greater than $\lambda_p$;
    ii) said center wavelengths are $\lambda_i$, where $i=1, \ldots n$, with n being an integer equal to or greater than 2;
    iii) said gratings are selected such that $\lambda_i = \lambda_{i-1} + \Delta\lambda_i$, where $\Delta\lambda_i$ is a length within a Stokes band associated with the optical fiber, and $\lambda_{i-1} = \lambda_p$ if $i=1$; and
    iv) $\lambda_n \leq \lambda_s$.

4. Apparatus according to claim 3, wherein the device is a Raman laser, the optical fiber is silica-based optical fiber, $\lambda_p$ is about 1.06 μm, $\lambda_s$ is about 1.5 μm, $\Delta\lambda_i$ corresponds to a Stokes shift of about 450 $cm^{-1}$, and n is greater than 2.

5. Apparatus according to claim 1, wherein the optical device is a Raman or Brillouin amplifier for radiation of wavelength $\lambda_s$, and wherein
    i) $\lambda_s$ is greater than $\lambda_p$;
    ii) said center wavelengths are $\lambda_i$, where $i=1, \ldots n$, with n being an integer equal to or greater than 2;
    iii) said gratings are selected such that $\lambda_i = \lambda_{i-1} + \Delta\lambda_i$, where $\Delta\lambda_i$ is a length within a Stokes band associated with the optical fiber; and $\lambda_{i-1} = \lambda_p$ if $i=1$; and
    iv) $\lambda_s$ is greater than $\lambda_n$.

6. Apparatus according to claim 5, wherein the device is a Raman amplifier, the optical fiber is silica-based optical fiber, $\lambda_p$ is about 1.06 μm, $\Delta\lambda_i$ corresponds to a Stokes shift of about 450 $cm^{-1}$ and $\lambda_s$ is approximately equal to 1.3 μm.

7. Apparatus according to claim 4, the apparatus being an optical fiber communication system that further comprises
    i) transmitter means that comprise means for generating a signal radiation of wavelength $\lambda_{signal}$;
    ii) receiver means, spaced apart from the transmitter means, that comprise means for detecting the signal radiation of wavelength $\lambda_{signal}$;
    iii) optical fiber transmission means that signal-transmissively connect the transmitter and receiver means;
    iv) means for coupling the output radiation of wavelength $\lambda_s$ of said Raman laser into said optical fiber transmission means.

8. An optical fiber communication system according to claim 7, wherein $\lambda_{signal}$ is about 1.5 μm, the system comprising an erbium-doped fiber amplifier located intermediate the transmitter and receiver means, and the means for coupling the output radiation of the Raman laser into the optical transmission means are spaced from said erbium-doped fiber amplifier, with $\lambda_s$ selected such that the radiation of wavelength $\lambda_s$ serves as pump radiation of the erbium-doped fiber amplifier.

9. An optical fiber communication system according to claim 8, wherein the means for coupling the output radiation of the Raman laser into the optical fiber transmission means are located close to or at the receiver means.

10. Apparatus according to claim 6, the apparatus being an optical fiber communication system that further comprises i) transmitter means that comprise means for generating a signal radiation of wavelength $\lambda_s$;

ii) receiver means, spaced apart from the transmitter means, that comprise means for detecting the signal radiation of wavelength $\lambda_s$; and iii) optical fiber transmission means that signal-transmissively connect the transmitter and receiver means, wherein said Raman amplifier is located intermediate said transmitter and receiver means, and said length of optical fiber forms at least part of said optical fiber transmission means.

11. Apparatus according to claim 1, further comprising a source of seed radiation of wavelength $\lambda_{seed}$ essentially equal to the center wavelength associated with one of said at least two pairs of reflectors, and means for coupling said seed radiation into the optical cavity defined by said one pair of reflectors.

12. Apparatus according to claim 5, further comprising means for introducing pump radiation of wavelength $\lambda_{p'} \neq \lambda_p$ into said length of optical fiber.

13. Apparatus according to claim 5, further comprising a pair of reflectors having a center wavelength $\lambda_{n'} \neq \lambda_n$, with $\lambda_{n'}$ selected to provide the amplifier with a broadened gain bandwidth.

14. Apparatus according to claim 3, further comprising a reflector having center wavelength essentially equal to $\lambda_s$ and peak reflectivity of at least 98%.

15. Apparatus according to claim 3, further comprising an unpaired reflector having center wavelength essentially equal to $\lambda_p$.

16. Apparatus comprising an optical device that comprises a) a length of optical fiber;

b) means for introducing pump radiation of wavelength $\lambda_p$ into said length of optical fiber;

c) spaced-apart reflector means that define an optical cavity for radiation of a predetermined wavelength, with the cavity comprising at least a portion of the length of optical fiber; wherein the device is adapted for emission of radiation of wavelength $\lambda_s \neq \lambda_p$ from said length of optical fiber;

characterized in that d) the pump radiation is continuous wave radiation;

e) the reflector means comprise at least one pair of reflectors, associated with each of said reflectors being a center wavelength of a reflection band and a peak reflectivity, with the two reflectors of the at least one pair having essentially the same center wavelength and being spaced apart, such that the reflectors of the at least one pair define an optical cavity for radiation of wavelength equal to said center wavelength of the reflectors of the at least one pair, each of the two reflectors of the at least one pair having a peak reflectivity of at least 98%;

f) associated with said given optical cavity is an added round trip loss for radiation of wavelength equal to said center wavelength, said added round trip loss being at most 1.5 dB; and g) said center wavelength is less than $\lambda_p$.

17. Apparatus according to claim 16, wherein $\lambda_s$ is less than $\lambda_p$ and the optical device is an anti-stokes Raman amplifier or Raman laser.

18. Apparatus according to claim 16, wherein the length of optical fiber is silica-based optical fiber, $\lambda_p$ is about 1.32 μm, $\lambda_s$ is greater than $\lambda_p$, and the device is a four-photon mixing amplifier for radiation of wavelength $\lambda_s$.

19. Apparatus according to claim 16, wherein the length of optical fiber is silica-based optical fiber, $\lambda_p$ is about 1.32 μm, $\lambda_s$ is greater than $\lambda_p$, the reflector means further comprise an unsymmetrical pair of reflectors having a center wavelength greater than $\lambda_p$, with one of the reflectors of the unsymmetrical pair having peak reflectivity of at least 98% and the other of the reflectors having peak reflectivity less than 98%, and the device is a four-photon mixing laser.

20. Apparatus according to claim 19, further comprising means for generating the pump radiation of wavelength $\lambda_p$, said means comprising a Raman laser comprising an optical cavity for radiation of wavelength equal to said center wavelength of the reflectors of the at least one pair.

21. Apparatus according to claim 20, wherein the center wavelength of the reflectors of the at least one pair is about 1.09 μm, and $\lambda_s$ is about 1.67 μm.

* * * * *